United States Patent [19]

Barrows

[11] 4,261,452
[45] Apr. 14, 1981

[54] OVERRUNNING CLUTCH

[75] Inventor: Robert E. Barrows, Fincastle, Va.

[73] Assignee: Ingersoll-Rand Company, Woodcliff Lake, N.J.

[21] Appl. No.: 78,165

[22] Filed: Sep. 24, 1979

[51] Int. Cl.³ .................... F16D 45/00; F02N 15/06
[52] U.S. Cl. ................................. 192/42; 74/6;
74/7 C; 192/46; 192/63; 192/103 R
[58] Field of Search ............... 192/42, 46, 63, 89 A, 192/103 R, 104 B; 74/6, 7 R, 7 A, 7 C

[56] References Cited

U.S. PATENT DOCUMENTS

| 2,602,335 | 7/1952 | Miller | 74/7 |
| 3,187,870 | 6/1965 | Sabatini | 192/42 X |
| 3,263,509 | 8/1966 | Digby | 74/6 |
| 3,300,006 | 1/1967 | Digby | 192/63 |
| 3,306,409 | 2/1967 | Giometti | 192/46 X |
| 3,319,755 | 5/1967 | Digby | 192/42 X |
| 3,714,834 | 2/1973 | Digby | 74/6 |

FOREIGN PATENT DOCUMENTS 1420081  1/1976  United Kingdom ............... 192/46

Primary Examiner—Rodney H. Bonck
Attorney, Agent, or Firm—Walter C. Vliet

[57] ABSTRACT

An overrunning clutch designed for use with engine starters and the like whereby the starter may apply its output to start the engine without damage due to overspeed of critical starting motor components after the engine has started and obtained running speed.

The overrunning clutch of this invention is provided with two splines. The first a straight spline which allows axial translation of the starter output shaft and a second helical spline which assists in engagement and disengagement of interlocking face clutch jaws between the input drive shaft and the output drive shaft. A centrifugally restrained clutch engagement spring in combination with the helical spline permits overrunning with minimum wear of the face clutch jaws.

7 Claims, 6 Drawing Figures

# OVERRUNNING CLUTCH

BACKGROUND OF THE INVENTION

This invention relates to devices, such as engine starters, which require a means to allow starter torque to be applied in one direction of rotation while permitting an overrun condition in the same direction of rotation after the engine has started. In the past, these devices where supplied have been cumbersome, expensive, and subject to excess wear as a result of incomplete disengagement or clutch reset forces, such as developed by conventionally applied spring force.

SUMMARY OF THE INVENTION

The principal object of this invention is to provide an overrunning clutch capable of sustaining very high speed overrunning with minimum wear. A further object of this invention is to provide an overrunning clutch which allows axial translation of the output shaft member, such as required for positive engagement of the starter pinion. A further object of the invention is to provide an interlocking face clutch which is spring loaded to its engaged position and which is driven by means of a helical spline to its disengaged position when the drive is being overrun. Another object of the invention is to provide a means for restraining the clutch engagement spring in the overrun condition whereby such spring is ineffectual to return the face clutch jaws into engagement. A primary object of the invention is to provide a simple, economical and reliable overrunning clutch for use with air or electric starters or the like. These and other objects are obtained in an overrunning clutch comprising: an input shaft, a first clutch member mounted for translation along and rotation with the input shaft, an output shaft mounted in at least partially concentric relation to the input shaft, a second clutch member mounted by means of a helical spline for translation and rotation about the output shaft, the first clutch member and the second clutch member coact to effect drive between the input and the output shafts.

DESCRIPTION OF THE PREFERRED EMBODIMENT

The following description is provided in order to fully understand the nature of the invention. Although it will be described in terms of an air starter overrunning clutch, it should be understood that the clutch device is equally applicable to electric starters or other similar devices requiring overrun capability.

Figure 1:
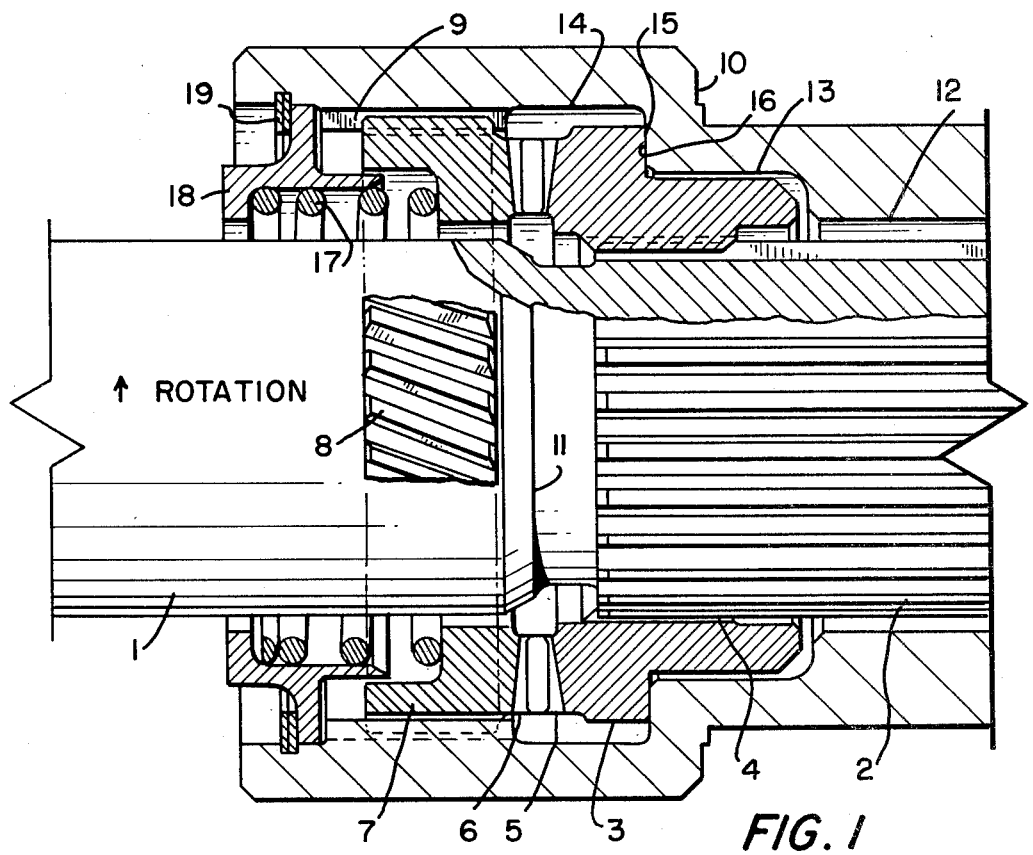
FIG. 1 is a partial cutaway elevation view of the overrunning clutch of this invention.
Figure 2:
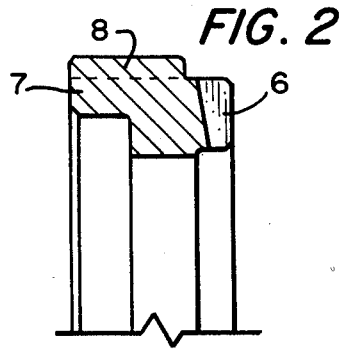
FIG. 2 is a partial side sectional elevation of the driven face clutch jaw.
Figure 3:
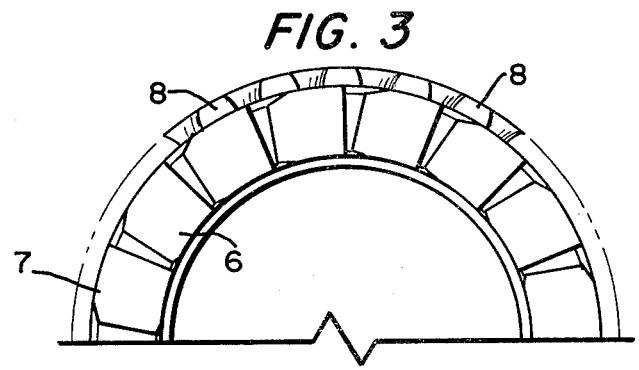
FIG. 3 is a partial end elevation view of the driven face clutch jaw.

Referring now to FIG. 1, a drive shaft 1 is shown which entends horizontally through the axial center of the clutch device. The drive shaft 1 is rotated or driven by any conventional means, such as an air or electric motor, and may be driven through any suitable gear or other reduction means. It is sufficient to understand for the purpose of this invention that the drive shaft is rotated in a given direction at a speed which, in the case of an air starter or electric starter, is sufficient to rotate the engine to its starting speed. In FIG. 1, the rotation is shown to be counterclockwise when viewed from the left hand side of the drive shaft.

The right hand end of the drive shaft 1 is provided with a straight spline 2, which engages a driving face clutch ring 3. The driving face clutch ring is shown as essentially a ring-shaped member, which is provided with a mating straight spline 4 on its inner surface which contacts and is driven by straight spline 2. It can be appreciated by one skilled in the art that the use of the straight splines 2 and 4 allow the free axial translation of driving face clutch ring 3 relative to drive shaft 1.

Figure 4:
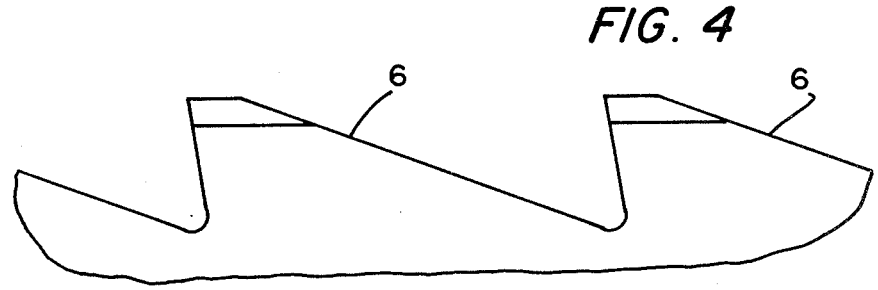
FIG. 4 is an engagement tooth profile for the driven jaw.
Figure 6:
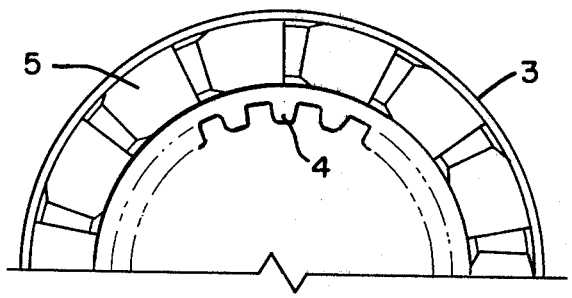
FIG. 6 is a partial end elevation view of the driving jaw.
Figure 5:
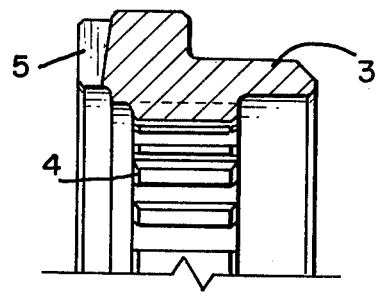
FIG. 5 is a partial side sectional elevation of the driving jaw.

The left hand side of driving face clutch ring 3, as shown in FIG. 1, is provided with a face jaw 5. The nature of the face jaw can best be seen by viewing FIGS. 4, 5 and 6, which in turn show the side elevation in FIG. 5, the end elevation in FIG. 6 and a typical tooth profile in FIG. 4. Face jaws of this nature are well known in the art and need not be further explained here. A driven face jaw 6 is provided on driven face clutch ring 7, which is shown mounted concentrically around drive shaft 1 to the left of driving face clutch ring 3. The outside circumferences of the driven face clutch ring 7 is provided with a mating helical spline 8, which in turn engages a helical spline 9 on driven shaft 10.

In the embodiment shown, the drive shaft 1 is shown mounted concentrically within a hollowed out portion of driven shaft 10. The drive shaft 1 as shown is essentially of uniform diameter having straight spline 2 at one end with an appropriate relief groove 11 between the spline and the remainder of the shaft. The driven shaft 10 is counterbored to three different diameters. The first diameter 12 provides clearance for the drive shaft, which is shown inserted therein. The second diameter 13, which is slightly larger than the first diameter, provides clearance for the driving face clutch ring. A third diameter 14 provides clearance for the driven face clutch ring 7 and its external helical spline 8. The helical spline 9 extends inward from the third diameter 14 to engage the mating helical spline 8 of the driven face clutch ring 7. The difference in the diameter between the second diameter 13 and the third diameter 14 provides a shoulder 15 which serves to restrain the driving face clutch ring from axial translation towards the right as shown in FIG. 1. The corresponding and mating shoulder 16 formed on the driving face clutch ring 3 is accomplished by reducing the diameter of the driving face clutch ring on its side opposite the driving face jaw 5.

In its engaged position as shown in FIG. 1, the driven face clutch ring 7 is forced to the right against the driving face clutch ring 3 by means of a return spring 17, which is retained in a spring cup 18, which is in turn retained in the third diameter bore of the driven shaft 10 by means of a snap ring 19. In driving operation as shown in FIG. 1, the drive shaft 1 is rotated counterclockwise, and the driven shaft 10 is likewise driven counterclockwise at the same speed as the driving shaft 3 by means of the face jaw clutch driving through, in turn, straight spline 2, mating straight spline 4, driving face clutch ring 3, driving face jaw 5, driven face jaw 6, driven face clutch ring 7, mating helical spline 8, helical spline 9, and finally driven shaft 10. The driven face clutch ring 7 is held in contact with the driving face clutch ring 3 by means of return spring 17 and the interaction of the mating helical spline 8 with helical spline 9, which produces a force which urges the driven face clutch ring 7 to the right as shown in FIG. 1. This is the typical starting mode.

It should be understood that the straight spline 2 and mating straight spline 4 permit the axial or horizontal translation of driven shaft 10 to the right as shown in FIG. 1 to allow engagement of a starting pinion (not shown) with a flywheel or similar connection of the engine to be started. The axial translation of the driven shaft 10 may be accomplished by any conventional means, such as a mechanical fork and linkage arrangement or a solenoid or air piston arrangement as conventionally used in positive engagement starters.

Upon the engine starting, it can be appreciated by one skilled in the art that the driven shaft 10 will be accelerated in the counterclockwise direction so as to overrun the drive shaft 1. The disengaging action of the face clutch jaws 5 and 6 will ramp the driven face clutch ring 7 to the left as shown in FIG. 1 assisted by the action of the helical spline. As the driven shaft continues to accelerate relative to the drive shaft 1, the action of the helical splines 8 and 9 will tend to further separate the face jaws 5 and 6. In addition, as the driven shaft obtains a high rotational speed, the return spring will be thrown centrifugally outward to contact the spring cup 18 thereby frictionally retaining the return spring and preventing it from returning the driven face clutch ring 7 to engagement with driving face clutch ring 3. This results in a unique and unusual benefit by preventing the rapid wear of the face clutch jaws during overrun.

After the engine has started and obtained running speed, the driven shaft may be retracted to the left as shown in FIG. 1 by conventional means as previously described. Upon disengagement of the starter pinion, the driven shaft will deaccelerate and ultimately reach a speed slow enough to permit the return spring to release from the walls of the spring cup and to return the driven face clutch ring 7 back into its engaged position as shown in FIG. 1.

Having described the invention in terms of a starter, numerous other applications and/or modifications will occur to one skilled in the art. I do not wish to be limited in the scope of my invention except as defined in the following claims.

I claim:

1. An overrunning clutch comprising:
   an input shaft;
   a first clutch member mounted towards one end of said input shaft for rotation with said input shaft;
   an output shaft having a bore in its one end for receiving said one end of said input shaft in at least partially concentric relationship;
   a second clutch member mounted to said output shaft by means of a helical spline within said bore for translation and rotation within said output shaft;
   said first clutch member and said second clutch member coact through a common jaw face to effect drive between said input and said output shafts;
   said helical spline forces said second clutch member into engagement with said first clutch member during its driving mode, and forces said second clutch member out of engagement with said first clutch member in its overrunning mode.

2. An overrunning clutch according to claim 1 wherein: said common jaw face is comprised of ramped teeth.

3. An overrunning clutch according to claim 1 wherein: said first clutch member is mounted to said input shaft by means of a straight spline.

4. An overrunning clutch according to claim 1 wherein: said second clutch member is urged towards said first clutch member by spring means.

5. An overrunning clutch according to claim 4 wherein:
   said spring means is retained in a cup means; and
   said spring means expands by centrifugal force within said cup means in its overrunning mode so as to frictionally restrain said spring means by said cup means and thereby negate the effect of said spring.

6. An overrunning clutch for a starter motor comprising:
   an input shaft having a straight spline about at least a portion of its periphery;
   a driving face clutch ring mounted concentrically about said drive shaft having a mating straight spline on its inner circumference which coacts with said straight spline of said drive shaft;
   said driving face clutch ring having a ramp tooth jaw farce towards its one end, and a mating shoulder towards its other end;
   a driven face clutch ring mounted concentrically about said input drive shaft for free rotation thereabouts;
   said driven face clutch ring having a ramp tooth jaw face mating to said ramp tooth jaw face of said driving face clutch ring;
   said driven face clutch ring having a mating helical spline on its periphery;
   a driven output shaft mounted concentrically about said input drive shaft and said driving face clutch ring and said driven face clutch ring;
   said driven output shaft having a helical spline on an inner surface which mates with said mating spline of said driven face clutch ring;
   said helical spline having a helix angle which forces said driven face clutch ring into engagement with said driving face clutch ring through their respective ramp tooth face jaws during the driving mode of said overrunning clutch, and out of engagement during the overrunning mode of said overrunning clutch;
   said driven face clutch ring being further urged towards said driving face clutch ring by a coil spring acting on its one end;
   said coil spring being held in engagement with said driven face clutch ring by a spring cup means;
   said spring cup means being mounted concentrically within said output drive shaft; and
   said driving face clutch ring is restrained from axial translation away from said driven face clutch ring by interaction of said mating shoulder and a corresponding shoulder on said output drive shaft.

7. An overrunning clutch according to claim 6 wherein:
   said spring means is expanded by centrifugal force and is restrained by frictional contact in said cup means during the operation of the overrunning clutch in its overrunning mode.

* * * * *